United States Patent [19]

Durand

[11] 4,199,250
[45] Apr. 22, 1980

[54] FOLDING POCKET DEVICE FOR THE REPRODUCTION OF PHOTOGRAPHS AND OTHER DOCUMENTS

[76] Inventor: Paul A. Durand, 3 rue du Dr. Goldstein, 95410 Groslay, France

[21] Appl. No.: 926,148

[22] Filed: Jul. 19, 1978

[30] Foreign Application Priority Data

Jul. 22, 1977 [CH] Switzerland .................... 9031/77

[51] Int. Cl.$^2$ .................... G03B 27/32; G03B 7/08
[52] U.S. Cl. .................... 355/39; 354/42
[58] Field of Search .............. 355/18, 39, 40, 63, 355/64, 21, 72, 74, 75; 354/270, 42, 105–109

[56] References Cited

U.S. PATENT DOCUMENTS

| | | | |
|---|---|---|---|
| 1,487,536 | 3/1924 | Campau | 354/270 |
| 1,933,817 | 11/1933 | Miller et al. | 355/39 |
| 2,170,959 | 8/1939 | Bartels et al. | 354/270 |
| 2,615,366 | 10/1952 | Rothweiler | 355/39 |
| 3,709,119 | 1/1973 | Van Der Meer | 355/21 X |
| 3,858,224 | 12/1974 | Heaney | 354/42 |
| 3,959,803 | 5/1976 | Marvel | 354/105 |

FOREIGN PATENT DOCUMENTS

| | | | |
|---|---|---|---|
| 151994 | 6/1904 | Fed. Rep. of Germany | 355/18 |
| 97649 | 2/1923 | Switzerland | 355/18 |

*Primary Examiner*—Donald A. Griffin
*Attorney, Agent, or Firm*—Lerner, David, Littenberg & Samuel

[57] ABSTRACT

Apparatus for multiprinting photographs, particularly those taken with an instantaneous development still camera, are disclosed. The apparatus adapts such a camera resting on a planar surface for reproducing photographs or other documents, and includes an optical system, a first support member for mounting the optical system on the camera lens, a second support member for mounting the photograph, and a base connecting the two support members a predetermined distance apart so that when the optical system is mounted on the camera lens and the apparatus and the camera are both resting side by side on a planar surface, the optical axis of the camera and the apparatus are in optical alignment and ready for use for such photographic reproduction.

2 Claims, 4 Drawing Figures

FOLDING POCKET DEVICE FOR THE REPRODUCTION OF PHOTOGRAPHS AND OTHER DOCUMENTS

The present invention concerns a folding pocket device for the reproduction of photographs or other documents.

The usual means for the rapid reproduction of documents, whether they be outlines or half-tints, requires the use of expensive, difficult to handle and cumbersome devices.

The present invention proposes to remedy this disadvantage by making a pocket device, light, small and inexpensive by which, joined to a still camera, for example a still camera of the instantaneous development kind, the reproduction of a document is immediately obtained anywhere and any time.

With this aim in mind, the device according to the invention is characterized in that it comprises an optical system, a support for the document to be reproduced, a support for mounting the optical system on the lens of a still camera of the instantaneous development kind, and a base connecting, at a predetermined distance, the support of the optical system to the support of the document, in such a way as to align on the optical axis of the still camera placed on a flat surface, the said optical system and the said document to be reproduced.

The present invention will be better understood once reference is made to the description of a production example and to the attached drawing in which.

Figure 1:
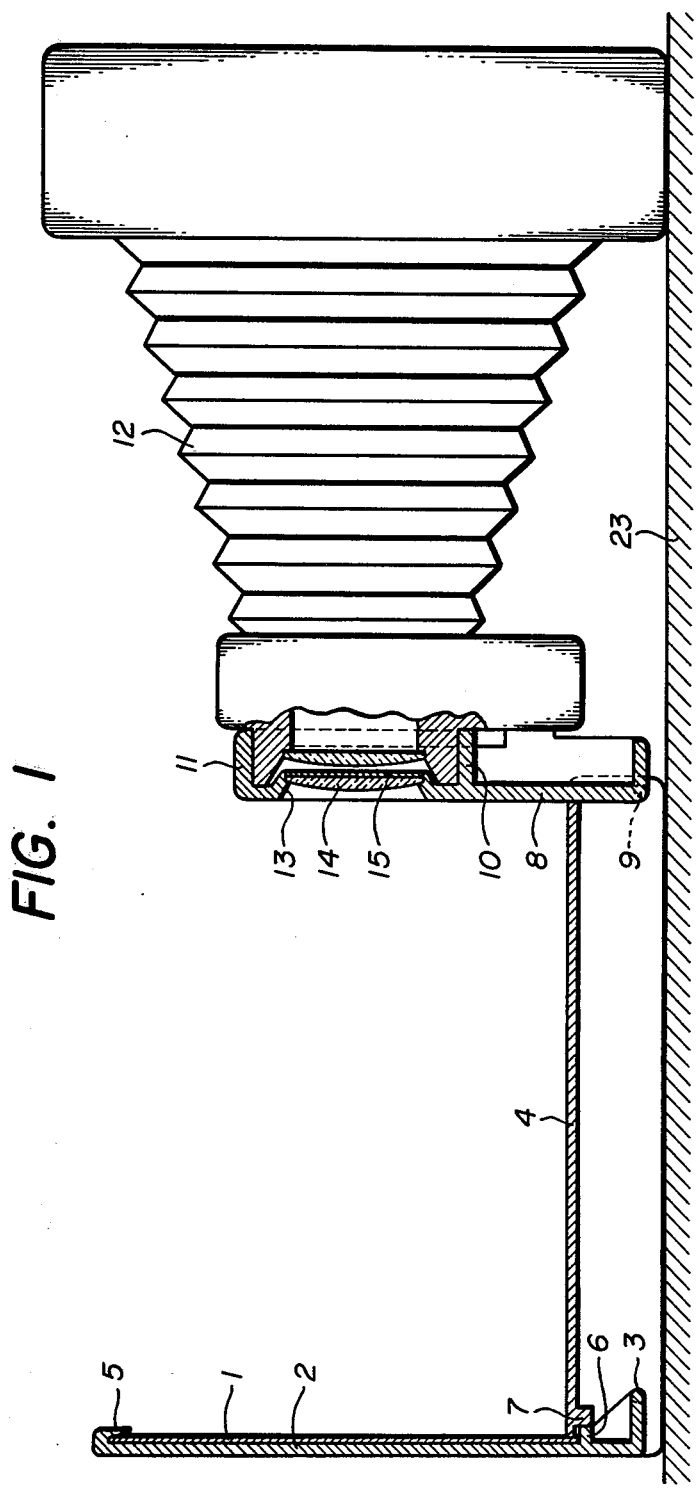
FIG. 1 is a side and a cross-section view of the device mounted in the work position on a suitable still camera.
Figure 2:
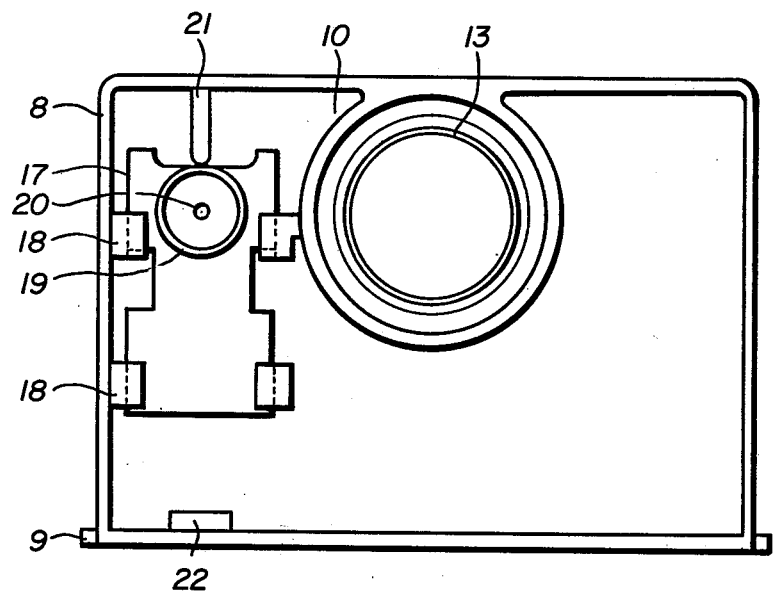
FIG. 2 represents a front view of the support of the optical system.
Figure 3:
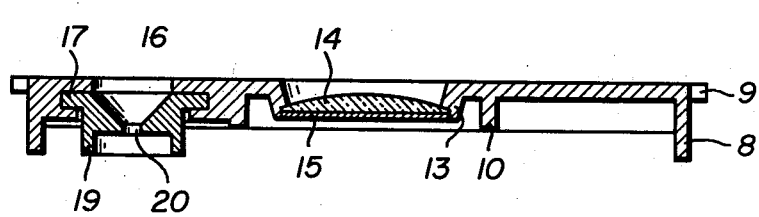
FIG. 3 is an upper view of this support, cut as per its axis.
Figure 4:
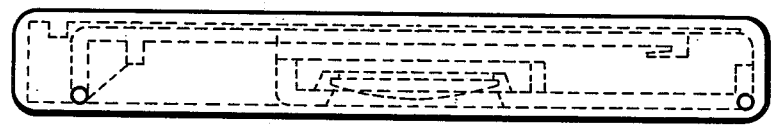
FIG. 4 is a view of the device, folded and covered with a hood.

With reference to the figures, the document to be reproduced is placed in FIG. 1 against a support 2 articulated by axes 3 on the base 4 in the form of a U. The top is held by clips 5 and the bottom is held between the support 2 and the base 4 which position the document when bump 6 on the support 2 comes up against bump 7 on base 4 to assure a positioning of support 2 perpendicular to base 4. At the other end of base 4 is a support 8 articulated by means of axes 9. At the center of this support is a circular bump with an inside diameter corresponding exactly to the outside diameter of the lens 11 of a still camera 12. Inside this bump 10, and concentric with it, there is another bump 13 which carries a convergent lens component or a collection of convergent lens components 14 and possibly a coloured filter 15.

If the still camera 12 comprises a connected photo-electric cell, a hole 16 is made in the support 8 in order to let the light diffused by the document 1 enter into the said photo-electric cell. If the film, with which the still camera 12 is loaded is slow, which is often the case with colour films, it is better to reduce, for example by means of a diaphragm, the light which enters into the cell. Thus a small diaphragm can be used and a simplified optical system and relatively imprecise construction are possible. For this purpose, a part 17 slides against the support 8 and under grooves 18. It bears a bump 19 which encases the lens of the photo-electric cell of the still camera 12 and comprises a hole 20 whose diameter has been determined in order to give the correct positioning with the diaphragm chosen for the lens 11 of the still camera. This part 17 is in place for covering the cell when it comes up against a bump 21. On the contrary, it uncovers the complete hole 16 when it comes up against a bump 22.

This part 17 can moreover contain a coloured filter if, for the reproduction of documents in colour, it is desirable to correct the chromatism of the light received by the cell.

The height of the bump 10 with relation to the bottom part of the base 4 has been chosen so that when the support 8 is placed against the lens of the still camera 12, the bottom part of the base 4 is on the same plane as the bottom part of the still camera 12. It is therefore sufficient to place end to end the still camera 12 and the reproduction device, the whole being placed on a surface more or less flat and the reproduction device having been made solidary with the lens 11 by means of the circular bump 10 to obtain a whole, perfectly aligned and stable. This stability obtained by the combination of the reproduction device, the still camera and a liaison plane acting as a support, allows long exposure times without the risk of moving. It is thus possible for example for the combined optical system comprising lens 11 and lens component 14 to work with a very small diaphragm, which will give sharp reproductions by means of a summary optical solution and an imprecise complete base with supports, for example, made of moulded synthetic material.

This stability also offers the possibility of setting and releasing several times the shutter for a single exposure without any risk of moving.

The power of the lens component 14 constituting the optical system of the device has been chosen in such a way that when the still camera 12 is situated in the range of settings, the correct focusing assures the reproduction of the document at the required scale, for example, the scale 1/1.

The still camera 12 is preferably of the instantaneous development kind. The document 1 is thereby reproduced by an extremely simple means and almost instantaneously. This device constitutes a useful accessory for users of still cameras with instantaneous development since it is possible to print a great number of copies from the same photograph.

When the reproduction operation is finished, the support 2 is tipped up between the sides of base 4, likewise support 8. Next a hood 25 is placed between the sides of base 4, this hood, like the base, having a form of a U, the two U being crossed. A small rectangular closed box is thus constituted which fits easily into a pocket. The use and functioning of the device are as per the following method.

The support being half-open, the document 1 is slid under the clips 5 above and rests on bump 6 at the bottom. The support 2 is then brought to a stop perpendicularly to base 4, likewise support 8. The device thus unfolded is then mounted on the lens of the still camera, the whole being placed on a flat surface as described previously. It is then sufficient to release the shutter of the still camera 12 to make a photo to reproduce the document 1 instantaneously, providing of course that the still camera is an instantaneous development kind. The rigidity and stability of the whole are obtained by the simple combination of the still camera 12, the reproduction device and a flat surface acting as a support.

The device according to the invention is inexpensive and solves in particular the problem of the reproduction or the multi-printing of photographs taken with a still camera of the instantaneous development kind.

I claim:

1. Apparatus for adapting a camera which includes a photoelectric cell and which is resting on a planar surface for the reproduction of photographs or other documents comprising an optical system, a first support member for mounting said optical system on the lens of said camera, a second support member for mounting said photograph or other document to be reproduced, a base connecting said first support member to said second support member a predetermined distance from each other, said first support member, said base, and said second support member having a substantially U-shaped configuration when in use so that when said optical system is mounted on the lens of said camera, said apparatus and said camera are both resting side by side on said planar surface, the optical axis of said camera and said apparatus being in optical alignment and ready for use for said reproduction, and a diaphragm member mounted on said first support member for cooperation with said photoelectric cell whereby said diaphragm member can adjust the amount of light received by said photoelectric cell.

2. The apparatus of claim 1 wherein said diaphragm member comprises a diaphragm plate slidably mounted on said first support member, said diaphragm plate including an aperture and being slidable between a first position wherein said photoelectric cell remains unobstructed by said diaphragm plate and a second position wherein said aperture is in alignment with said photoelectric cell so as to reduce the amount of light received by said photoelectric cell.

* * * * *